US 6,915,984 B2

(12) United States Patent
Sternberger et al.

(10) Patent No.: US 6,915,984 B2
(45) Date of Patent: *Jul. 12, 2005

(54) APPARATUS AND METHOD FOR MOUNTING A CASCADE SUPPORT RING TO A THRUST REVERSER

(75) Inventors: Joe Sternberger, Wichita, KS (US); Michael K. Lallement, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/779,184

(22) Filed: Feb. 13, 2004

(65) Prior Publication Data

US 2004/0159091 A1 Aug. 19, 2004

Related U.S. Application Data

(63) Continuation of application No. 10/368,525, filed on Feb. 17, 2003, now Pat. No. 6,824,101.

(51) Int. Cl.[7] ............................................... F02C 3/02
(52) U.S. Cl. ............. 244/110 B; 60/226.2; 239/265.19
(58) Field of Search ................. 244/110 B; 239/265.11, 239/265.19, 265.23, 265.29; 248/544, 233.41, 637; 60/226.1, 226.2, 230

(56) References Cited

U.S. PATENT DOCUMENTS

| 5,778,659 | A | 7/1998 | Duesler et al. |
| 6,584,763 | B2 | 7/2003 | Lymons et al. |
| 6,592,074 | B2 | 7/2003 | Dehu et al. |

OTHER PUBLICATIONS

U.S. Appl. No. 10/758,887, filed Jan. 16, 2004, McAuley.

*Primary Examiner*—Peter M. Poon
*Assistant Examiner*—Timothy D. Collins
(74) *Attorney, Agent, or Firm*—Harness Dickey & Pierce P.L.C.

(57) ABSTRACT

A thrust reverser for a jet engine of a mobile platform. The thrust reverser includes a hinge beam defining a first track and a latch beam defining a second track. The thrust reverser also includes at least one cascade support ring having an upper end portion and a lower end portion. A first fitting is disposed at the upper end portion of the cascade support ring. The first fitting includes an engagement portion slidably positioned within the first track. A second fitting is disposed at the lower end portion of the cascade support ring. The second fitting includes an engagement portion slidably positioned within the second track.

30 Claims, 8 Drawing Sheets

APPARATUS AND METHOD FOR MOUNTING A CASCADE SUPPORT RING TO A THRUST REVERSER

CROSS-REFERENCE TO RELATED APPLICATION

This application is a continuation of U.S. patent application Ser. No. 10/368,525 filed on Feb. 17, 2003 now U.S. Pat. No. 6,824,101. The disclosure of which is incorporated herein by reference.

FIELD OF THE INVENTION

The present invention relates generally to thrust reversers for jet engines and more particularly to apparatus and methods for mounting cascade support rings to thrust reversers.

BACKGROUND OF THE INVENTION

Thrust reversers are commonly used to reverse the direction of thrust generated by an aircraft jet engine so that the same may be used as a deceleration force for the aircraft. As shown in FIGS. 1 through 5, many existing thrust reversers 10 include a fixed structure 12, a sleeve 14 that is translatable relative to the fixed structure 12, and a plurality of cascades 16 each of which includes a plurality of vanes 18. The fixed structure 12 of the thrust reverser 10 includes a torque box 20, a hinge beam 22, a latch beam 24, and a cascade support ring 26 mounted to each cascade 16.

In addition, the cascades 16 are commonly bolted to the thrust reverser 10. As shown in FIGS. 2 and 4, nut and bolt assemblies 28 are used to attach the fore end portion 30 of each cascade 16 to the torque box 20. Similarly, nut and bolt assemblies 32 are used to attach the aft end portion 34 of each cascade 16 to its corresponding cascade support ring 26.

Referring to FIG. 5, the upper and lower end portions 36 and 38 of the cascade support rings 26 are, in turn, bolted to the respective hinge and latch beams 22 and 24, thus forming relatively fixed joints 25 therebetween. More specifically, nut and bolt assemblies 40 are used to attach the end portions 36 and 38 of the cascade support rings 26 to fittings 42, which are integral to the hinge and latch beams 22, 24.

A drill cage or jig is typically used to aid in accurate drilling of the torque box 20 and the cascade support rings 26 with the bolt holes, which are used for attachment of the cascades 16 to the torque box 20 and to the cascade support rings 26. The corresponding bolt holes in the fore and aft end portions 30 and 34 of the cascades 16 are also precisely located within certain minimal tolerances to ensure a proper connection.

Although the bolted joints 25 used for mounting cascade support rings to the latch and hinge beams have worked well for their intended purpose, the inventors hereof have recognized that it would be even more beneficial if such joints required less assembly time and tooling costs. Accordingly, the inventors have recognized that a need exists in the art for a device and method for more efficiently attaching cascade support rings to latch and hinge beams.

SUMMARY OF THE INVENTION

In order to solve these and other needs in the art, the inventors hereof have succeeded in designing apparatus and methods for mounting a cascade support ring to a thrust reverser. In one exemplary embodiment, the thrust reverser includes a hinge beam, a latch beam, and at least one cascade support ring having an upper end portion and a lower end portion. A first fitting disposed at the upper end portion of the cascade support ring. The first fitting includes an engagement portion slidably positioned within a first track defined by the hinge beam. A second fitting is disposed at the lower end portion of the cascade support ring. The second fitting includes an engagement portion slidably positioned within a second track defined by the latch beam.

In another preferred form, the present invention provides a method of mounting a cascade support ring to a thrust reverser for a jet engine of a mobile platform. In one embodiment, the method comprises: providing an upper end portion of the cascade support ring with a first fitting; providing a lower end portion of the cascade support ring with a second fitting; providing a hinge beam of the thrust reverser with a first track sized to slidably receive therein an engagement portion of the first fitting; providing a latch beam of the thrust reverser with a second track sized to slidably receive therein an engagement portion of the second fitting; and slidably positioning the engagement portions of the first and second fittings within the first and second tracks, respectively.

Further areas of applicability of the present invention will become apparent from the detailed description provided hereinafter. It should be understood that the detailed description and specific examples below, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 6:
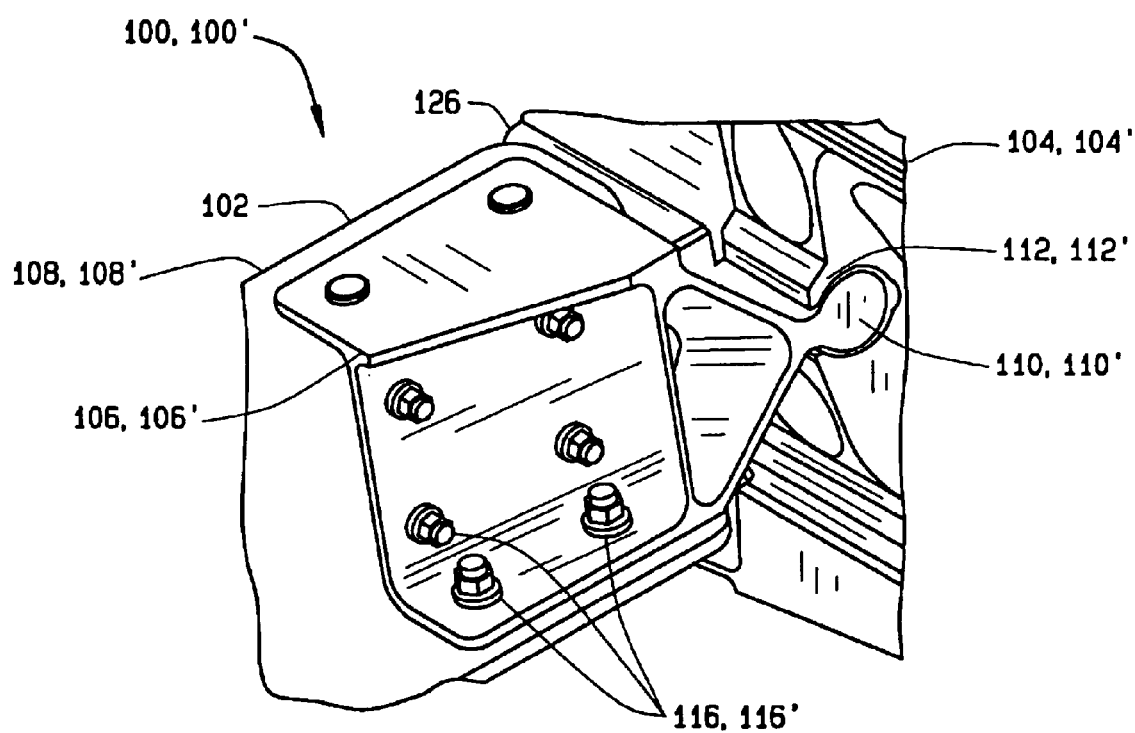
FIG. 6 is a perspective view of a slider joint disposed between a cascade support ring and either a hinge beam or a latch beam in accordance with a preferred embodiment of the present invention.
Figure 7:
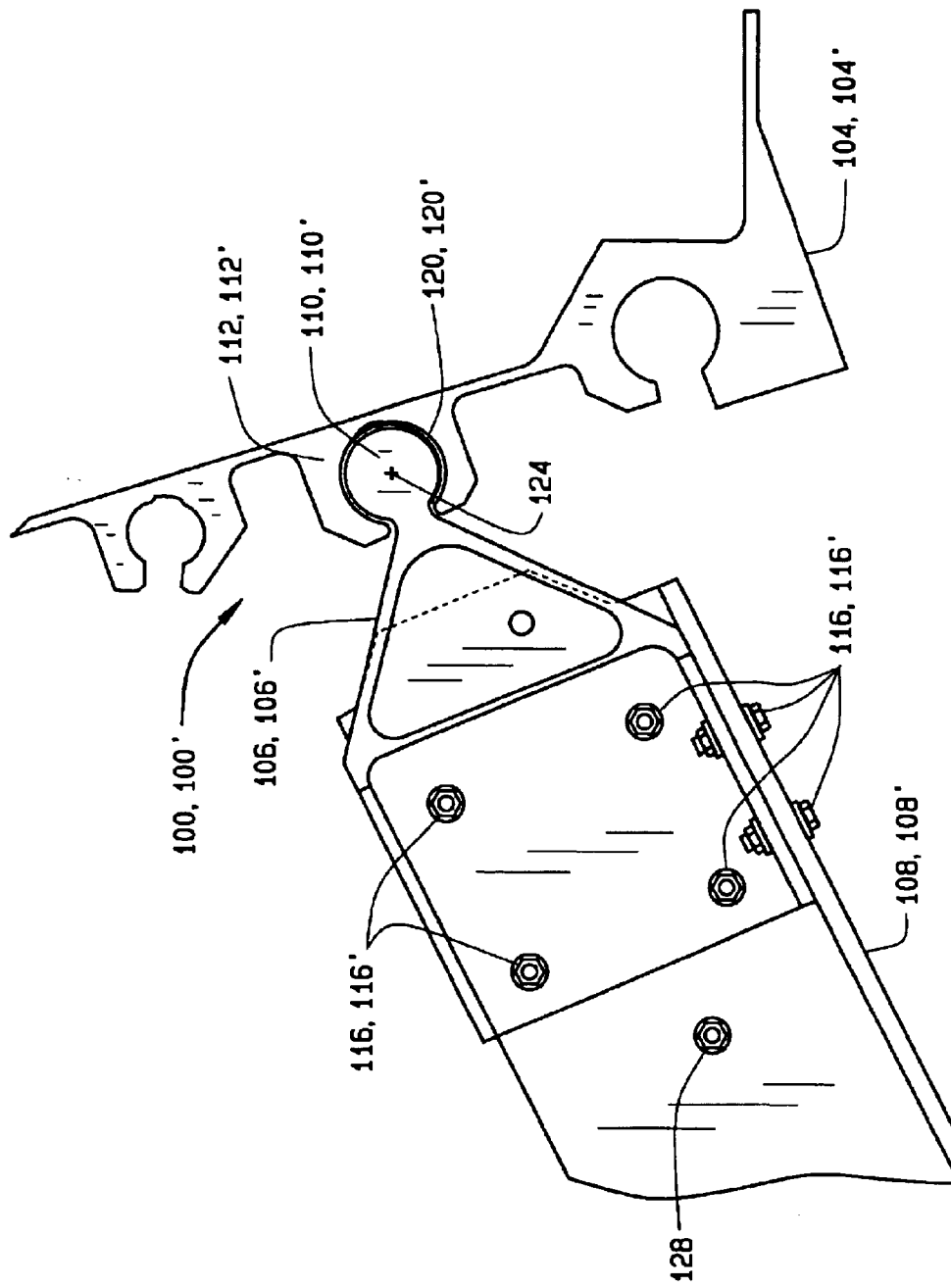
FIG. 7 is a cross-sectional view of the slider joint shown in FIG. 6.
Figure 8:
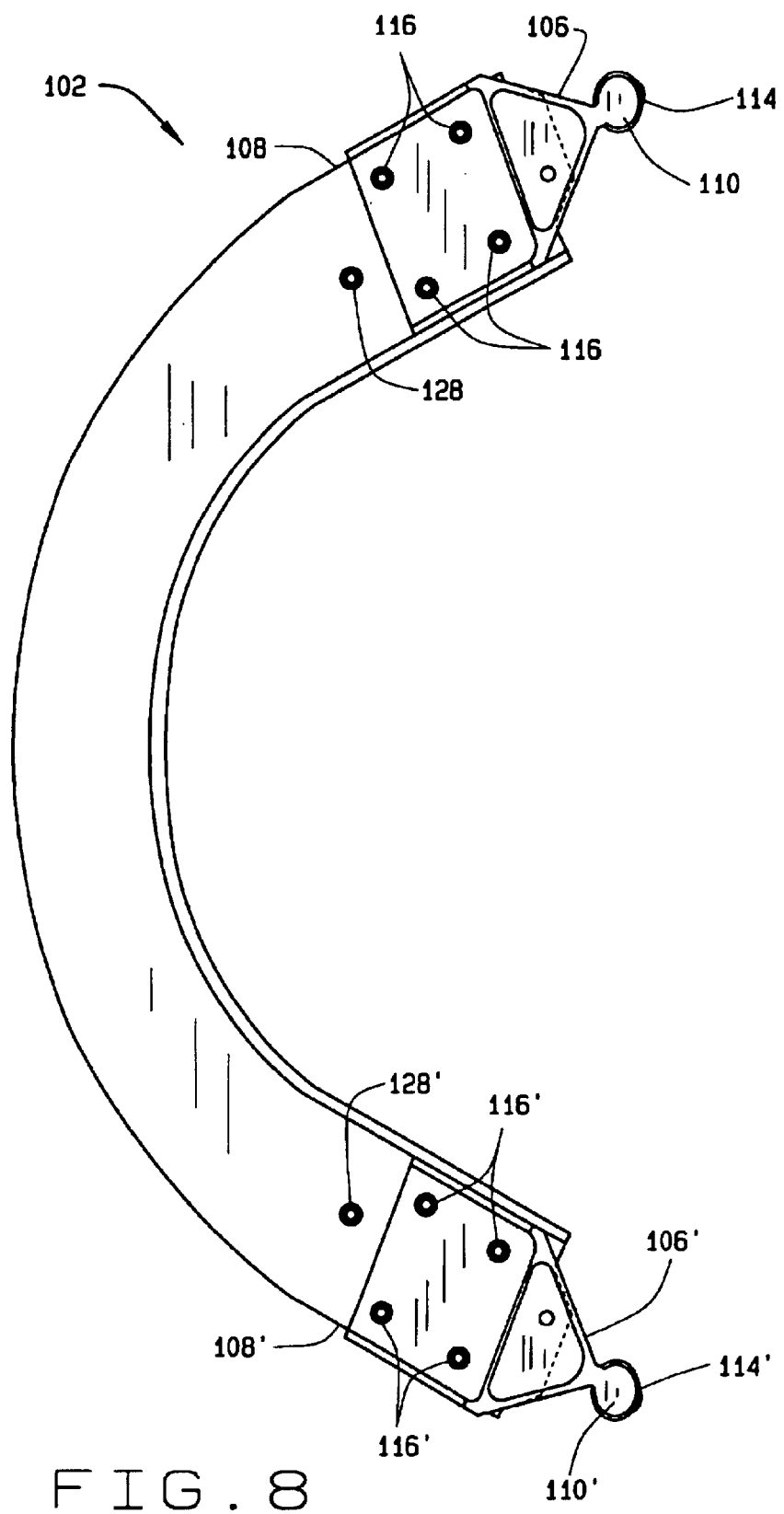
FIG. 8 is a side view of a cascade support ring including a fitting disposed at its upper and lower end portions.

Referring to FIGS. 6 through 8, there are shown slider joints 100 and 100' in accordance with a preferred embodiment of the present invention. As described in detail below, the slider joint 100 is used to mount an upper end portion 108 of a cascade support ring 102 to a hinge beam 104 of a thrust reverser. The slider joint 100' is also used to mount a lower end portion 108' of the cascade support ring 102 to a latch beam 104' of the thrust reverser.

As shown in FIGS. 6 through 8, each slider joint 100, 100' includes a fitting 106, 106' disposed at the respective upper and lower end portions 108, 108' of the cascade support ring 102. The fitting 106 disposed at the upper end portion 108 includes an engagement portion 110 sized to be slidably received within a track 112 defined by the hinge beam 104. The fitting 106' disposed at the lower end portion 108' of the cascade support ring 102 includes an engagement portion 110' sized to be slidably received within a track 112' defined by the latch beam 104'. It should be noted, however, that in other embodiments the tracks can be defined by the upper and lower end portions of the cascade support rings with the fittings being disposed on the hinge and latch beams.

For ease of identification and ease of presentation and not for purposes of limitation, the fitting 106 disposed at the upper end portion 108 of the cascade support ring 102 will also be referred to as the first fitting 106, whereas the fitting 106' disposed at the lower end portion 108' of the cascade support ring 102 will also be referred to as the second fitting 106'. Similarly, the track 112 defined by the hinge beam 104 will also be referred to as the first track 112, and the track 112' defined by the latch beam 104' will also be referred to as the second track 112'.

As best shown in FIG. 7, each engagement portion 110, 110' has a cross-section that is substantially circular. However, other cross-sectional shapes (e.g., rectangular) are also possible for the engagement portions depending on the particular application in which the slider joints 100 and 100' will be used.

Preferably, an outer surface of each engagement portion 110, 110' is lined or covered with a suitable friction-reducing, wear-resistant material. In the exemplary embodiment of FIG. 8, the engagement portions 110, 110' are covered with a wear-resistant tape 114, 114' that prevents, or at least substantially reduces, wear-and-tear on the engagement portions 110, 110'.

A wide range of materials may be used for the cascade support ring 102 and/or the first and second fittings 106, 106'. Preferably, lightweight materials are used for the cascade support ring 102 and the fittings 106, 106', such as aluminum or composite materials (e.g., graphite epoxy laminate). In addition, a wide range of manufacturing processes may be used to fabricate the cascade support ring 102 and the fittings 106 and 106'. By way of example only, the cascade support ring 102 may be formed via an extrusion process, and the fittings 106, 106' may be formed via a forging and/or machining process.

The first and second fittings 106, 106' may be attached to the respective upper and lower end portions 108, 108' of the cascade support ring 102 using any of a wide range of suitable fastening systems or methods (e.g., mechanical fasteners, machining, among others). In the exemplary embodiment of FIGS. 6 through 8, each fitting 106, 106' is bolted to the corresponding end portion 108, 108' of the cascade support ring 102 with nut and bolt assemblies 116, 116'. Alternatively, the fittings 106 and/or 106' and the cascade support ring 102 may be integrally formed as a single component.

The first and second tracks 112, 112' will now be described in further detail. The first track 112 is defined by the hinge beam 104 and is sized to slidably receive therein the engagement portion 110 of the first fitting 106. The second track 112' is defined by the latch beam 104' and is sized to slidably receive therein the engagement portion 110' of the second fitting 106'.

As best shown in FIG. 7, the first and second tracks 112, 112' each have a cross section that is substantially c-shaped. Alternatively, the tracks may have a cross section that is substantially u-shaped with corners forming right angles. Other cross-sectional shapes, however, are also possible for the tracks depending on the particular application in which the slider joints 100 and 100' will be used.

Preferably, an inner surface of each track 112, 112' is lined with a suitable friction-reducing, wear-resistant material. In the exemplary embodiment of FIG. 7, a steel liner 120, 120' is disposed adjacent the inner surface of each track 112, 112'. The steel liner 120, 120' reduces the friction between the track 112, 112' and the corresponding engagement portion 110, 110' positioned within the track 112, 112'. The steel liner 120, 120' also prevents, or at least reduces, wear-and-tear of the tracks 112, 112'.

A wide range of materials may be used for the tracks 112, 112'. By way of example only, a lightweight material is preferably used for the tracks 112, 112', such as aluminum.

In the exemplary embodiment of FIGS. 6 through 8, the hinge beam 104 and the first track 112 are integrally formed as a single component. Similarly, the latch beam 104' and the second track 112' are also formed as a single component. Alternatively, either or both of the tracks 112, 112' may comprises a separate component that is attached to the corresponding hinge or latch beam 104, 104' using a suitable fastening system or method (e.g., mechanical fasteners, among others).

The joints 100 and 100' are assembled as follows to mount the cascade support ring 102 to the thrust reverser. The cascade support ring 102 and thrust reverser are positioned relative to one another to align the engagement portion 110 of the first fitting 106 with the first track 112 and to align the engagement portion 110' of the second fitting 106' with the second track 112'. Once aligned, the cascade support ring 102 and/or the thrust reverser are moved towards one another so that the engagement portions 110, 110' are slidably received within the first and second tracks 112, 112', respectively.

Once assembled, the joints 100 and 100' support the cascade support ring 102 in the inboard and outboard directions. The cascade support ring 102 is restrained in the fore and aft direction by the cascade 126 (FIG. 6) to which the cascade support ring 102 is bolted 128 (FIG. 7).

The joints 100 and 100' also provide at least some rotational freedom to the engagement portions 110, 110' even while they are positioned within the tracks 112, 112'. For example, the engagement portion 110 may be able to rotate clockwise or counterclockwise a few degrees about the point 124 (FIG. 7) when radial loading on the cascade 126 deflects the cascade support ring 102.

In another preferred form, the present invention provides a method of mounting a cascade support ring to a thrust reverser for a jet engine. In one embodiment, the method comprises: providing the upper end portion 108 of the cascade support ring 102 with the first fitting 106; providing the lower end portion 108' of the cascade support ring 102 with the second fitting 106'; providing the hinge beam 104 of the thrust reverser with the first track 112; providing the latch beam 104' of the thrust reverser with the second track 112'; and slidably positioning the engagement portions 110, 110' of the respective first and second fittings 106, 106' within the first and second tracks 112, 112', respectively.

Accordingly, the present invention allow cascade support rings to be mounted to thrust reversers more efficiently and easier than the methods presently recognized in the art. For example, the present invention eliminates the need for using a drill cage to provide the hinge and latch beams with bolt holes for attachment of the cascade support rings. This, in turn, allows for reductions in assembly time and tooling and part costs. In addition, the flexibility of the slider joints 100 and 100' allows cascade support rings to shift or float relative to the hinge and latch beams 104, 104', thus allowing the fore and aft end portions of the cascades to be more easily fastened to the torque box 20 and cascade support ring 26.

Figure 1:
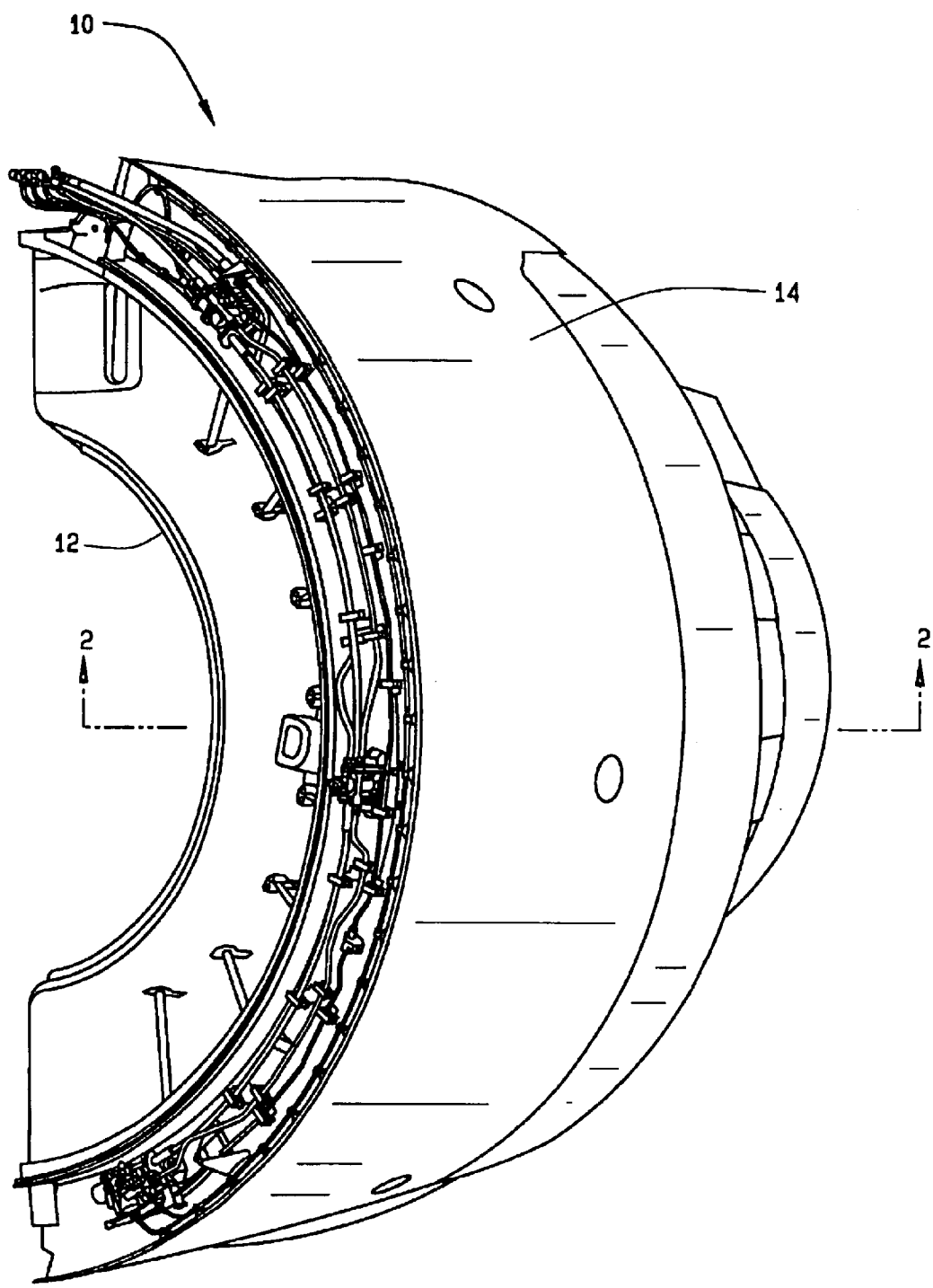
FIG. 1 is a partial perspective view of an exemplary thrust reverser.
Figure 2:
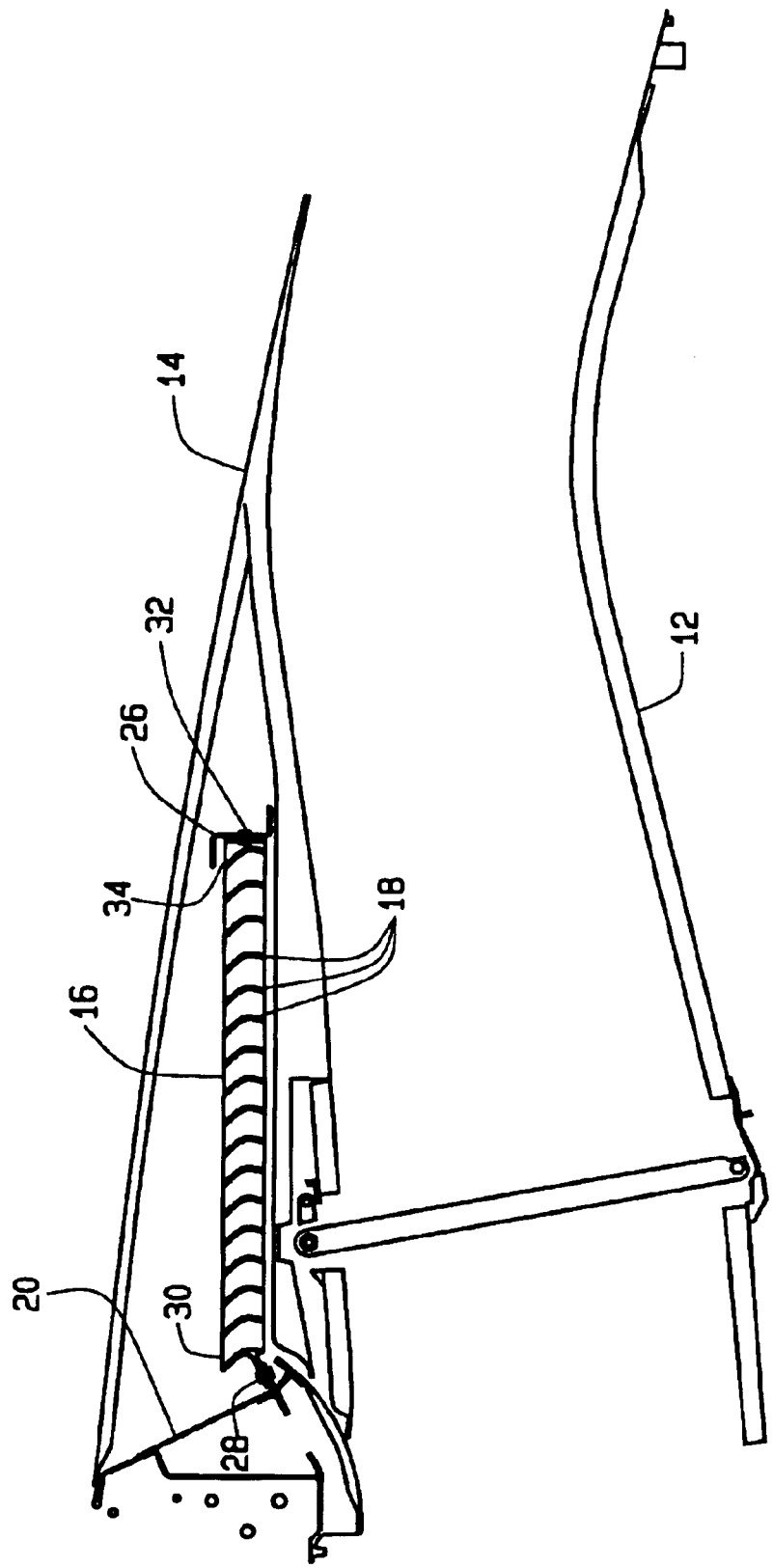
FIG. 2 is a cross-sectional view of the thrust reverser shown taken along the plane 2—2 in FIG. 1.
Figure 3:
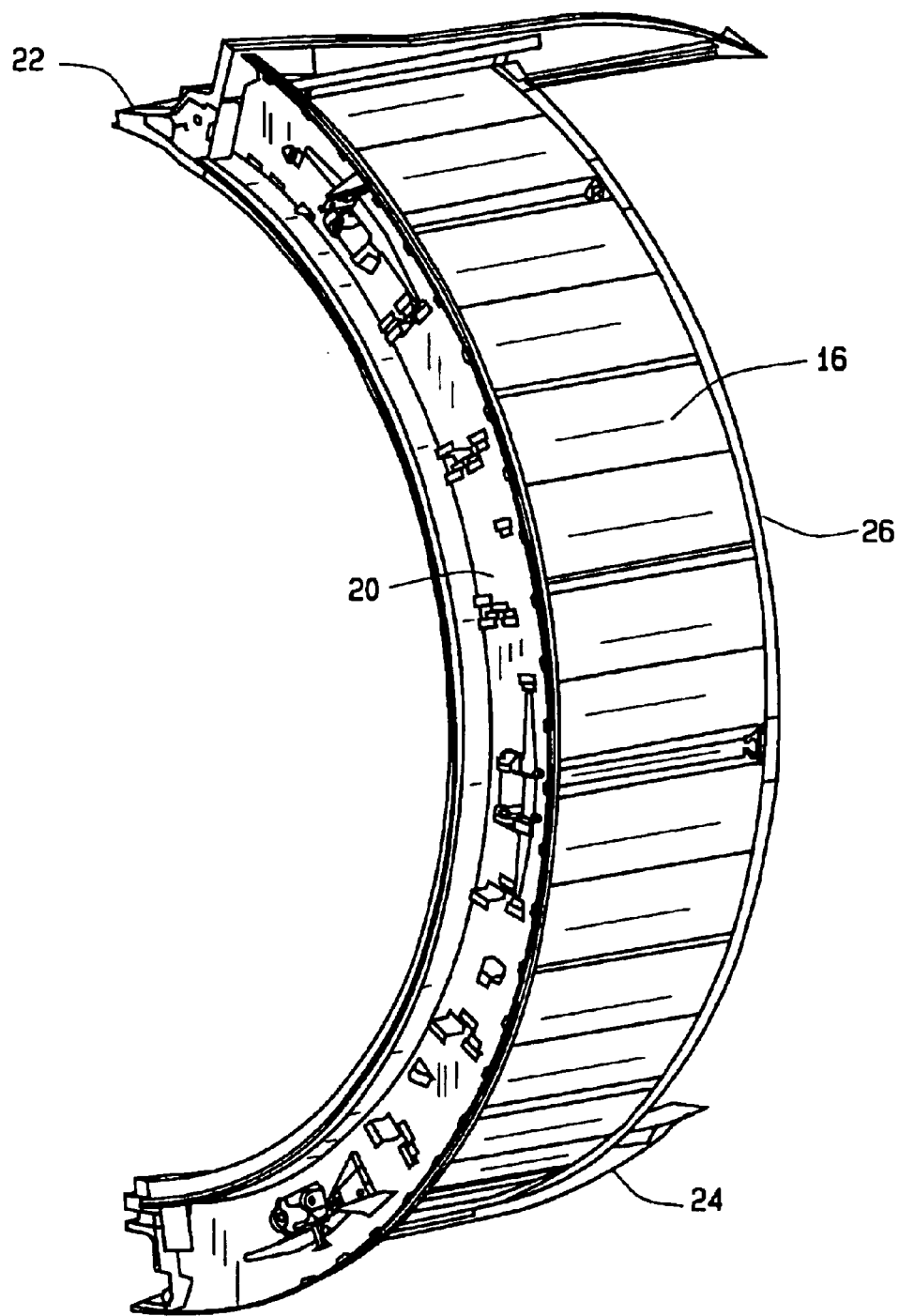
FIG. 3 is a perspective view of a conventional thrust reverser cascade installation.
Figure 4:
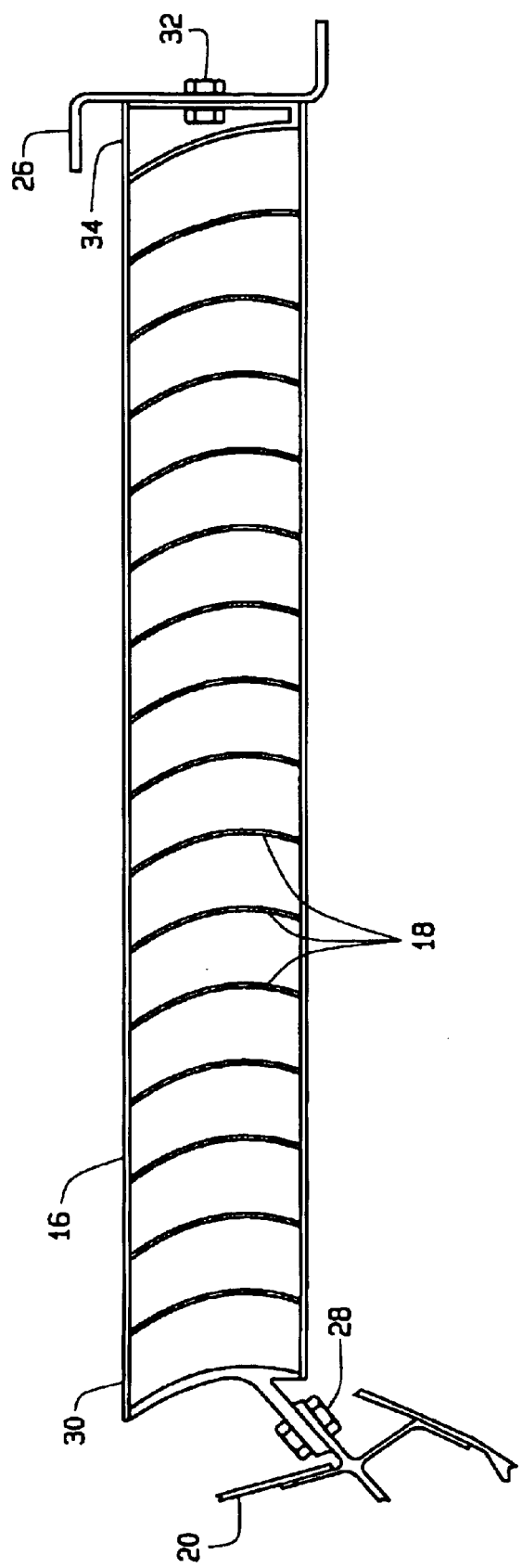
FIG. 4 is a cross-sectional view of a cascade including a fore end portion attached to a torque box and an aft end portion attached to a cascade support ring.
Figure 5:
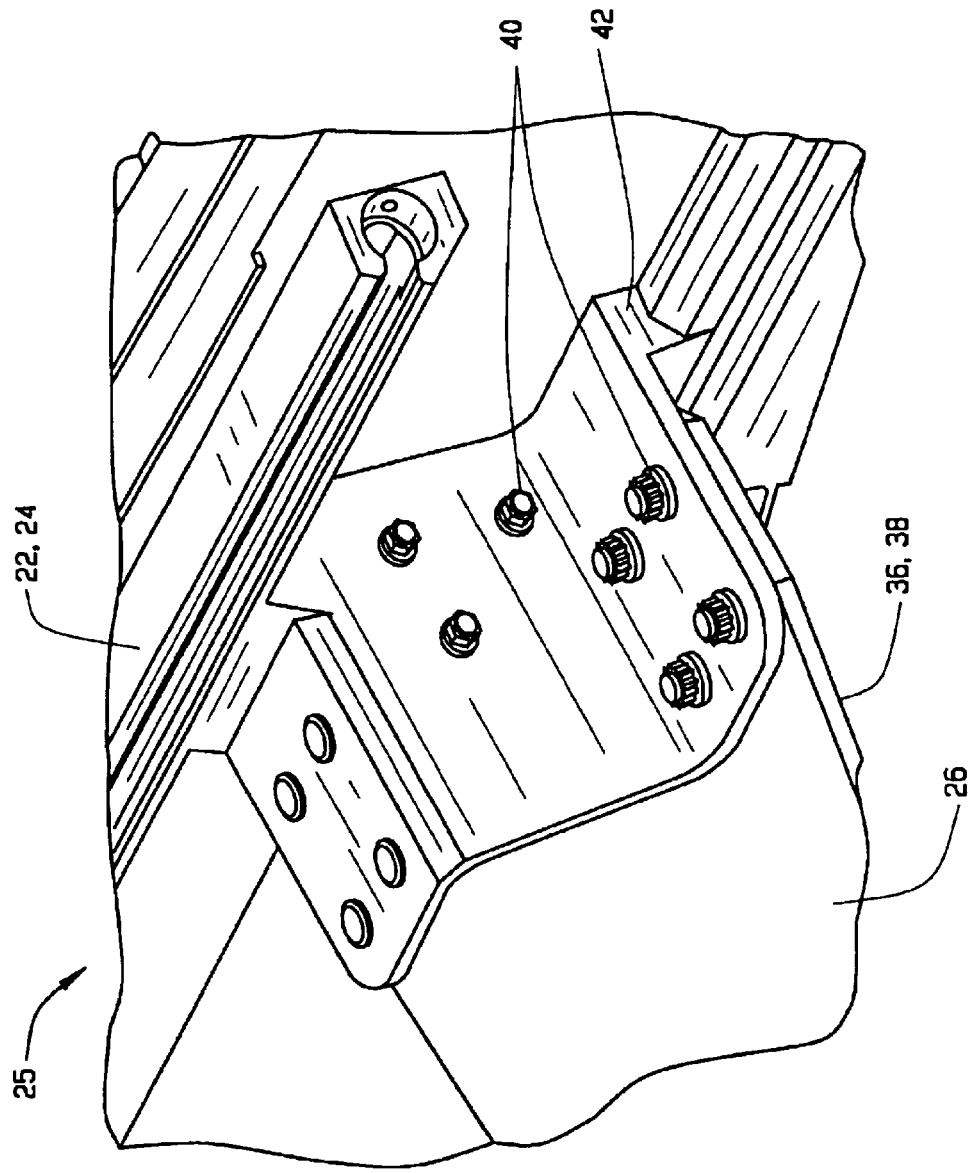
FIG. 5 is a perspective view of a conventional bolted joint disposed between a cascade support ring and either a hinge beam or a latch beam of a thrust reverser.

In addition, the slider joints 100 and 100' can be sized considerably smaller and lighter than the bolted joints 25 shown in FIG. 5. During operation of the jet engine, torque loading is transferred from the cascades into the cascade support rings, which then transfer the loads to the hinge and latch beams. To accommodate for such torque loading and the moments created thereby, known methods in the art employ large and heavy bolted joints to mount the cascade support rings to the hinge and latch beams.

With the present invention, however, the rotational nature of the slider joints 100 and 100' eliminates, or at least substantially reduces, the ability of the torque loads to react a moment in the plane of the cascade support ring into the hinge and latch beams. Instead, the torque loads are reacted in the form of hoop and reaction loads. Because the slider joints 100 and 100' do not have to accommodate relatively large moments produced by the torque loading, the slider joints 100 and 100' can be sized considerably smaller and lighter than the bolted joints currently being used.

It is anticipated that the invention will be applicable to any of a wide range of aircraft (e.g., but not limited to, commercial jets, private jets, military jets, among others) regardless of the manner in which the aircraft is piloted (e.g., directly, remotely, via automation, or in a combination thereof, among others). Indeed, the present invention should not be limited to just aircraft either. Rather, it is anticipated that the invention will be applicable to other mobile platforms. Accordingly, the specific references to aircraft herein should not be construed as limiting the scope of the present invention to only one specific form/type of aircraft or to aircraft alone.

It is also anticipated that the invention will be applicable to any one of a wide range of engines (e.g., but not limited to high bypass jet engines, turbofan engines, gas turbine engines). Accordingly, the specific references to jet engine should not be construed as limiting the scope of the present invention to only one specific form/type of engine.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. A thrust reverser for a jet engine of a mobile platform, the thrust reverser comprising:
    at least one cascade support ring;
    at least one track defined by one of the cascade support ring and another portion of the thrust reverser; and
    at least one engagement portion defined by the other one of said cascade support ring and said another portion of the thrust reverser, the engagement portion being sized to be disposed within the track to couple the cascade support ring to the thrust reverser.

2. The thrust reverser of claim 1, wherein the engagement portion is sized to be slidably received within the track.

3. The thrust reverser of claim 1, wherein the track comprises a substantially c-shaped cross section, and wherein the engagement portion comprises a substantially circular cross section.

4. The thrust reverser of claim 1, wherein the engagement portion is integral to the cascade support ring.

5. The thrust reverser of claim 1, wherein the engagement portion is attached to the cascade support ring.

6. The thrust reverser of claim 1, wherein the track is integral to the thrust reverser.

7. The thrust reverser of claim 1, wherein the track is attached to the thrust reverser.

8. The thrust reverser of claim 1, wherein the at least one track comprises a first track and a second track, and wherein the at least one engagement portion comprises a first engagement portion sized to be disposed within the first track, and a second engagement portion sized to be disposed within the second track.

9. The thrust reverser of claim 1, wherein:
    the thrust reverser includes a hinge beam defining the first track, and a latch beam defining the second track; and
    the cascade support ring includes an upper end portion defining the first engagement portion, and a lower end portion defining the second engagement portion.

10. The thrust reverser of claim 1, further comprising a wear-resistant material lining an inner surface of the track.

11. The thrust reverser of claim 1, further comprising a wear-resistant material lining an outer surface of the engagement portion.

12. A mobile platform, comprising:
    a jet engine for generating thrust;
    a thrust reverser for reversing direction of the thrust;
    at least one cascade support ring;
    at least one track defined by one of the thrust reverser and the cascade support ring; and
    at least one engagement portion defined by the other one of said thrust reverser and said cascade support ring, the engagement portion being disposed within the track to couple the cascade support ring to the thrust reverser.

13. The mobile platform of claim 12, wherein the engagement portion is sized to be slidably received within the track.

14. The mobile platform of claim 12, wherein the mobile platform comprises an aircraft.

15. The mobile platform of claim 12, wherein:
    the thrust reverser includes a hinge beam defining a first track, and a latch beam defining the second track; and
    the cascade support ring includes an upper end portion defining a first engagement portion sized disposed within the first track, and a lower end portion defining a second engagement portion disposed within the second track.

16. Apparatus for mounting a cascade support ring to a thrust reverser of a jet engine, the apparatus comprising:
    at least one track defined by one of the thrust reverser and the cascade support ring; and
    at least one engagement portion defined by the other one of said thrust reverser and said cascade support ring, the engagement portion being sized to be disposed within the track.

17. The apparatus of claim 16, wherein the engagement portion is sized to be slidably received within the track.

18. The apparatus of claim 16, wherein the track comprises a substantially c-shaped cross section, and wherein the engagement portion comprises a substantially circular cross section.

19. The apparatus of claim 16, wherein the engagement portion is integral to the cascade support ring.

20. The apparatus of claim 16, wherein the engagement portion is attached to the cascade support ring.

21. The apparatus of claim 16, wherein the track is integral to the thrust reverser.

22. The apparatus of claim 16, wherein the track is attached to the thrust reverser.

23. The apparatus of claim 16, further comprising a wear-resistant material lining an inner surface of the track.

24. The apparatus of claim 16, further comprising a wear-resistant material lining an outer surface of the engagement portion.

25. Apparatus for mounting a cascade support ring to a thrust reverser of a jet engine, the apparatus comprising:

at least one engagement portion defined by one of said thrust reverser and said cascade support ring; and means for receiving the engagement portion therein to couple the cascade support ring to the thrust reverser wherein said means is defined by the other one of said thrust reverser and said cascade support ring.

26. A method of mounting a cascade support ring to a thrust reverser for a jet engine of a mobile platform, the method comprising positioning at least one engagement portion defined by one of said thrust reverser and said cascade support ring within at least one track defined by the other one of said thrust reverser and said cascade support ring.

27. The method of claim 26, wherein the positioning includes slidably positioning the engagement portion within the track.

28. The method of claim 26, further comprising mounting a fitting defining the engagement portion to the cascade support ring.

29. The method of claim 26, wherein the positioning includes:

slidably positioning a first engagement portion defined by one of said thrust reverser and said cascade support ring within a first track defined by the other one of said thrust reverser and said cascade support ring; and slidably positioning a second engagement portion defined by one of said thrust reverser and said cascade support ring within a second track defined by the other one of said thrust reverser and said cascade support ring.

30. The method of claim 29, wherein:

the first track is defined by a hinge beam of the thrust reverser;

the second track is defined by a latch beam of the thrust reverser;

the first engagement portion is defined by an upper end portion of the cascade support ring; and the second engagement portion is defined by a lower end portion of the cascade support ring.

* * * * *